March 19, 1929.   J. B. DEMPSEY   1,705,964
PROCESS AND MECHANISM FOR CONNECTING ELECTRICAL CONDUCTORS
Filed May 17, 1926   2 Sheets-Sheet 1
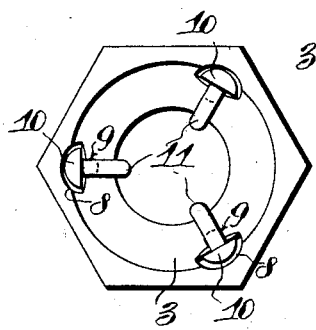
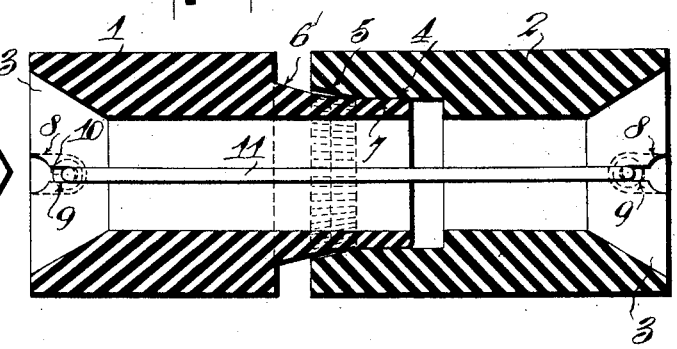
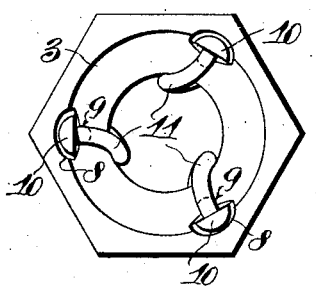
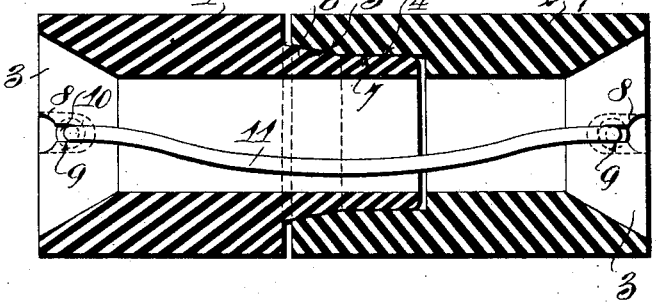
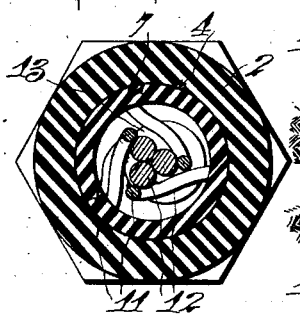
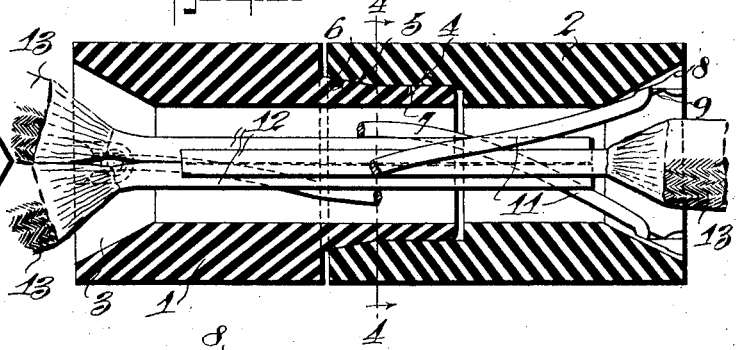
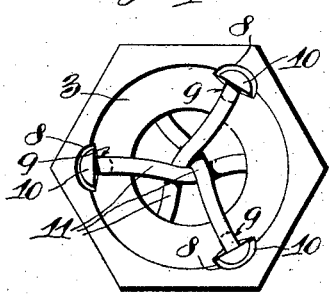
INVENTOR
James B. Dempsey.
BY
ATTORNEY March 19, 1929.  J. B. DEMPSEY  1,705,964
PROCESS AND MECHANISM FOR CONNECTING ELECTRICAL CONDUCTORS
Filed May 17, 1926  2 Sheets-Sheet 2
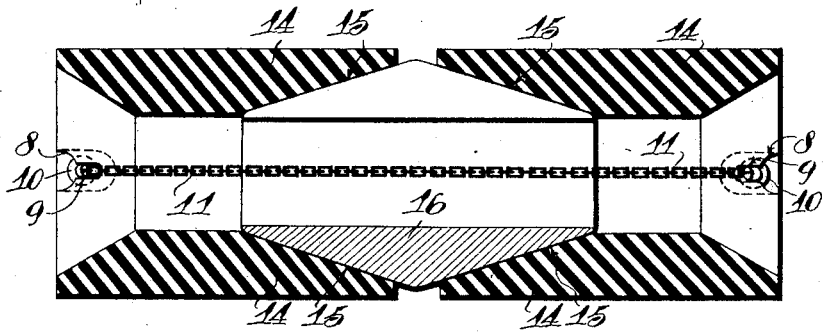
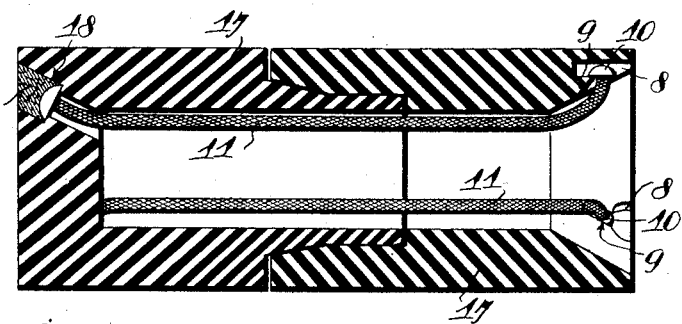
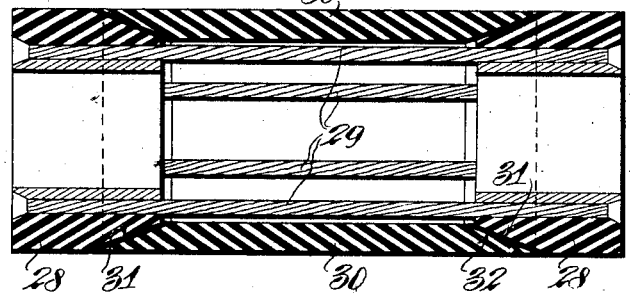
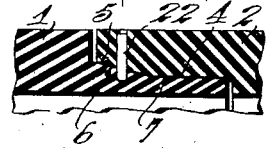
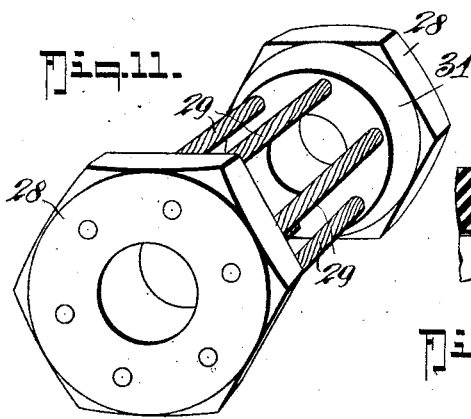
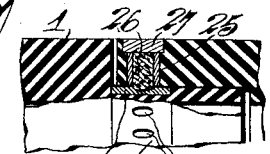
INVENTOR
James B. Dempsey.
BY
ATTORNEY Patented Mar. 19, 1929.

1,705,964

UNITED STATES PATENT OFFICE.

JAMES BRYAN DEMPSEY, OF WASHINGTON, DISTRICT OF COLUMBIA.

PROCESS AND MECHANISM FOR CONNECTING ELECTRICAL CONDUCTORS.

Application filed May 17, 1926. Serial No. 109,676.

My invention relates to the art of couplings or connecters used in joining together the ends of two or more electrical conductors, and it primarily has for its object to provide a new process for effecting the coupling of connecters by means of which the process may be carried out.

Generically my new process resides in winding upon the junction of two or more electrical conductors, as a core, a cable and maintaining the strands of the cable under continued tension.

The immediate object of the present invention is to provide a connecter for electrical conductors, that requires no soldering, no taping, no selection of size and a minimum amount of skill, pains and judgment on the part of the workmen.

The connecter comprises revoluble members respectively carried at opposite ends of the cable strands and having provisions by which they may be revolved on their axes, one with relation to another, thereby to twist or untwist the cable strands around the core (accordingly as the members are turned in one direction or the reverse) and having provision for holding the members against untwisting movements after the connecter shall have been placed and the cable strands twisted around the conductor ends as a core.

In its more specific nature the invention resides in those novel features of construction, combination and arrangement of parts, which will be hereinafter fully described, then be specifically pointed out in the appended claims, reference being had to the accompanying drawings, in which:—

Figure 1 is a vertical longitudinal section of a preferred embodiment of my invention, the parts being positioned as when first assembled with the cable strands in place.

Figure 2 is a view similar to Figure 1 showing the relation of the parts after the members have been turned to twist the cable strands and then turned back to untwist them and cause the cable strands to lie expanded ready to receive the ends of the connecters to be joined.

Figure 3 is a view similar to Figures 1 and 2, showing how three conductor ends may be joined together by the employment of my invention, the conductor ends being shown in elevation.

Figure 4 is a cross section on the line 4—4 of Figure 3.

Figure 5 is an end elevation of the connecter with the parts positioned as shown in Figure 1.

Figure 6 is a view similar to Figure 5 showing the position of the connecter parts when the cable strands have been initially twisted in the process of manufacturing the device.

Figure 7 is an end elevation of the connecter with the parts positioned as shown in Figure 2.

Figure 8 is a vertical longitudinal section of a modified embodiment of my invention, showing the use of a split sleeve that may be constricted around the conductor ends.

Figure 9 is a longitudinal section of another embodiment of the invention.

Figure 10 is a vertical longitudinal section of a further modification of my invention.

Figure 11 is a detail perspective view of a portion of the structure shown in Figure 10.

Figures 12, 13 and 14 are detail views hereinafter referred to.

In the drawings, in which like numerals of reference indicate like parts in all the figures, 1 and 2 represent the two relatively rotatable parts of the connecter. These parts have, preferably, their entrant ends or mouths 3 enlarged for a purpose presently explained.

One of the rotatable members is provided with a socket 4, the entrance to which is of frusto-conical form, as at 5, while the other member 1 is provided with a frusto-conical portion 6 and a cylindrical portion 7 to mate with the respective parts 5 and 4. It is also preferred that the parts 6 and 5, either or both of them, be roughened or milled in order to increase the frictional coefficient.

Each rotatable member 1 and 2 (in the preferred embodiment of the invention) is provided with one or more (three being preferable) recesses 8 and slots 9 which are made deep enough to allow the heads 10 of the cable strands or wires 11 to clear the conical mouths of the connecters.

The strands or wires 11 may be themselves composed of a single strand (Fig. 1) or of a plurality of strands twisted together (Fig. 10) as a rope, or they may be of woven strand construction (Fig. 9), or the strands 11 may be composed of chains or chain mesh (Fig. 8), the preferable requirement being that they should be flexible to a degree permitting twisting and untwisting for a reasonable number of operations without breaking the strands.

12 designates the wires or conductors to be connected. These conductors may be joined lengthwise or they may be entered from the same end of the connecter or a part entered at one end and the remainder at the other end, the non-insulated ends of the conductor, however, lying side by side within the connecter as shown.

The conductors have the usual insulated covers 13 which when the ends are to be connected, are tapered off toward the exposed ends of the conductor as shown in Figure 3.

In Figure 8 I have illustrated a modified embodiment of the invention. In this figure the rotatable members 14 have conical seats 15 to receive a split double coned sleeve 16 that is adapted to be contracted around the conductor ends of the wound cable as the members 14 are drawn together when turned to put the cable strands under tension.

In Figure 9 is shown another embodiment of the invention where one of the connecter members 17 is closed at one end. In this embodiment of the invention the connecters to be joined are all entered together. In order to place the cable strands in the member 17 it may be drilled at 18 with a countersunk aperture and afterwards plugged as at 19 to insure proper insulation.

In Figure 12 I have shown a threaded metal bushing 20 molded into the member 2 which is adapted to carry a set screw 21 to assist in holding the members 1 and 2 against reverse or untwisting rotation. Instead of employing a set screw for the purpose as shown in Figure 12, the parts may be drilled, after the connecter has been applied, and a pin 22 inserted as indicated in Figure 13, or if desired the parts may be secured by soldering, and in Figure 14 I have indicated one way in which this may be done. By reference to Figure 14 it will be observed that the male element of the member 1 is molded with a metallic ring 23 having indentations 24, and the member 2 may be provided with a countersunk aperture containing a metallic sleeve 25 into which solder 26 may be poured to unite the ring 23 and duct 25, after which an insulating plug 27 may be inserted to close the opening for insulation purposes.

With the parts 1 and 2 assembled as illustrated and the cable strands inserted, relative rotation of the parts 1 and 2 twists these wires into a cable. Continued rotation twists the cable strands taut so that when untwisted the wires tend to retain the imparted helical configuration and hug the walls of the bore, leaving maximum room inside for inserting the conductor ends. It is contemplated that the process of manufacture shall include this initial twisting and untwisting; the advantages being that the helical formed wires tend to hold themselves in place and the workman is furnished with the article ready to use.

The recesses 8 and slots 9 are made deep enough to allow the heads 10 of the cable strands or wires 11 to clear the conical mouths of the connecters. The mouths are enlarged to admit a short length of insulation on the conductors (see Figure 3) so as not to leave exposed any bare metal. The mating surfaces 4 and 7 insure coaxial rotation of the molded parts.

The conductor ends are inserted in the connecter in any desired relationship; abutting, overlapping, grouped or twisted together; and in any number that will enter within the untwisted cable.

When the conductors are inserted, rotating the parts 1 and 2 in opposite directions twists the cable on the conductors, as a core, exerting thereon a constricting force. At the same time, the pitch of the cable strands being large, a longitudinal force draws the parts 1 and 2 together and jams them on the tapered surfaces 5 and 6. This jamming prevents back-slip of the parts 1 and 2 and retains the cable strands taut. It is appropriate to mill the surfaces 5 and 6 in the molding process, so that meshing of the ridges and valleys assists the jamming to prevent loosening.

An advantage results in using only three strands for the cable. If the wires are not equal in length the axis of the cable wound is off the center line of the connecter in the direction of the shorter strands. This assures that the load is equally distributed among the three strands. It is obvious that one strand alone would function to make a connection or that more than three strands may be used if desired.

In Figures 10 and 11 is illustrated another modification of my invention and by reference to these figures it will be seen that the relatively rotatable parts of the connecter consists of end members 28 having tapered or conical surfaces 31 that are adapted to engage the similar surfaces 32 of a tubular intermediate member 30, the cable strands 29 being secured to the end members 28 in any desired fashion.

The preparation of this connecter for use by perliminarily twisting the strands 29 and then untwisting them is conducted on the same principle as the other embodiments of my invention, and the manner of using this embodiment is also essentially the same, and a further detailed description of the embodiment shown in Figures 10 and 11 is thought to be unnecessary.

While continual twisting and untwisting of the connecter would ultimately break the strands, nevertheless if they are made of chains or chain mesh or of woven sub-strands so as to be somewhat flexible, the connecter could be used an indefinite number of times for temporary joints without breaking. Furthermore the strands may be composed of copper plated ferro-metallic wires.

From the foregoing it is to be observed that my invention possesses the following advantages:

(a) The cable adjusts itself to any conductors or group of conductors that will enter the bore.

(b) A steel cable furnishes a great factor of safety against yield or breaking.

(c) Residing stretch in the wires takes up any yield in the conductors developed with time.

(d) The grip is effective throughout the length of the connecter, in contrast to a tapered helix—or the set-screw connecter.

(e) The character of every joint is uniform and does not require any skill, judgment or much care on the part of the workman.

(f) No solder, tape or selection of size is required; simply insert the conductors and twist until tight.

(g) The simplicity of application assures that every connection made with this connecter is practically under the control of the Underwriters' Laboratories through their system of factory inspection. The only dependence on the workman is that he twist the connecter tight. He is not depended upon to select a certain size connecter, to insulate the joint with tape nor is he induced to slight the connection as where he is required to hold a small device in one hand and "bear down" on a set screw with a screw driver: a slip resulting in an injured hand.

(h) This connecter is particularly suited to connecting flexible cords whose strands when spread are interlaced among the connecter strands as the connecter is tightened.

From the foregoing description, taken in connection with the accompanying drawings, it is thought that my invention will be clear to those skilled in the art, and it is obvious that slight changes in the details of construction of the connecter may readily be made without departing from the spirit of the invention.

What I claim is:

1. The method of joining conductors which consists in laying the conductor ends together, holding cable strands by their respective ends and twisting the strands around the conductors as a core while continually applying force to the cable in a direction along the axis of the core, thereby to keep the cable strands under continual tension.

2. A connecter comprising two members having central bores, at least one flexible member positioned within the bore and joining said members, said members having frictional engaging surfaces adapted, when said members have been turned for the purpose of twisting said flexible member around the conductors to be joined, as a core, to retain a continual tension in said flexible member.

3. A connecter comprising two members of molded insulation of external shape to engage a tool, said members having continuous central cylindrical bores and having surfaces mated for a tapered telescopic engagement for initial coaxial centralization of the members and for final mutual jamming as one member is rotated with respect to the other, a plurality of cable strands positioned within the bores, means for securing the ends of said strands to the respective members, all being arranged whereby when said members are turned with relation to one another the cable strands will be wound into a cable and the members will be drawn together into jamming engagement.

4. A connecter comprising two members of insulating material having mating surfaces and central bores, said members having flared mouths provided with T slots, cable strands located within said members and having their respective ends anchored in the said T slots.

5. A connecter comprising two members having central bores, at least one cable strand located within said members and anchored at its ends to the respective members, said members adapted to be turned on their common axis to twist said strand as a helix around inserted conductors, and means for maintaining said two members against reverse rotation after said strand has been twisted around inserted conductors.

6. A connecter comprising two members having mating surfaces and central bores, cable strands located within the bores and having their ends anchored to the respective members, whereby when said members are turned on their axes in opposite directions said strands will be wound around inserted conductors as a core and said members will be drawn tightly together, and means for maintaining said members in their tightened relation.

7. A connecter comprising members having central bores, cable strands located within said members and having their ends anchored to the outermost members, said members including a central split sleeve, said sleeve and said end members having engaging surfaces whereby as said end members are turned to twist said strands around inserted conductors as a core the end members will be drawn toward one another and caused to compress the sleeve.

8. A connecter comprising two members having central bores, at least one flexible member positioned within the bores and having its ends anchored to the respective members, said two members having engaging surfaces and being adapted to be turned on a common central axis to twist said flexible member around inserted conductors as a core.

9. A connecter comprising two members at least one of which has a central bore, said members telescoping one within the other and capable of rotary motion with respect to each other, at least one flexible member positioned within said bore and having its respective ends fastened to the respective members whereby upon rotation of said two members with respect to each other said flexible member will be twisted around the electrical conductors which are inserted within the central bore substantially as shown and described.

10. A connecter comprising two sleeve members whose ends are connected within the bores by a plurality of flexible strands, which strands are twisted to give a clamping action upon the electrical conductors which are inserted within the sleeve members, said sleeve members telescoping one within the other and being capable of rotary motion with respect to each other substantially as shown and described.

JAMES BRYAN DEMPSEY.